T. B. MASON.
STREET CLEANER'S CART.
APPLICATION FILED FEB. 5, 1913.

1,079,785.

Patented Nov. 25, 1913.

WITNESSES
G. Robert Thomas
J. L. McAuliffe

INVENTOR
Thomas B. Mason
BY Munn & Co.
ATTORNEYS

UNITED STATES PATENT OFFICE.

THOMAS BARTIN MASON, OF TRENTON, NEW JERSEY.

STREET-CLEANER'S CART.

1,079,785.  Specification of Letters Patent.  Patented Nov. 25, 1913.

Application filed February 5, 1913. Serial No. 746,300.

*To all whom it may concern:*

Be it known that I, THOMAS B. MASON, a citizen of the United States, and a resident of Trenton, in the county of Mercer and State of New Jersey, have invented a new and Improved Street-Cleaner's Cart, of which the following is a full, clear, and exact description.

My invention relates to hand carts employed by street cleaners who use a hand broom in their work.

An object of my invention is to provide a cart in which the sweepings may be collected expeditiously and in a convenient and cleanly manner.

In carrying out the invention, use is made of a cart body having means to detachably hold a bag or sack, and an endless chain is mounted within the closed body of the cart and carries receiving buckets adapted to dump the material into the sack, there being a novel pan and appurtenances disposed at an opening provided in the body at the side opposite the sack whereby the street cleaner may sweep the material in the street into a carrier bucket presented at the opening. Means are provided to lock the chain with an empty bucket disposed at the receiving opening.

The invention will be more particularly explained in the specific description hereinafter to be given.

Reference is to be had to the accompanying drawings forming a part of this specification, in which similar characters of reference indicate corresponding parts in all the views.

Figure 1:
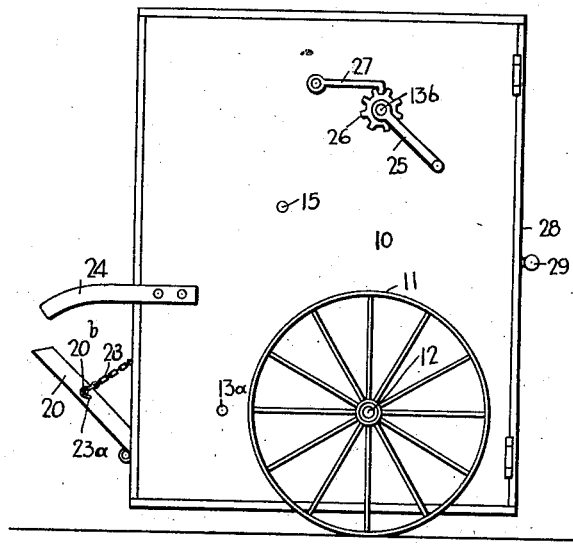
Figure 2:
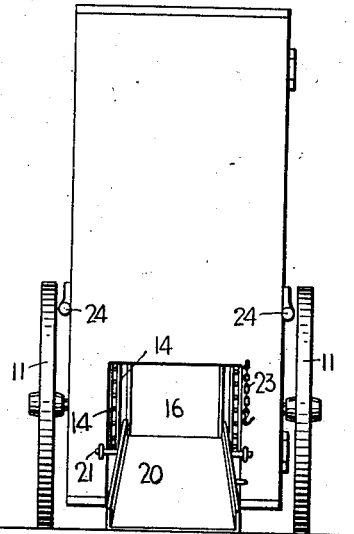
Figure 3:
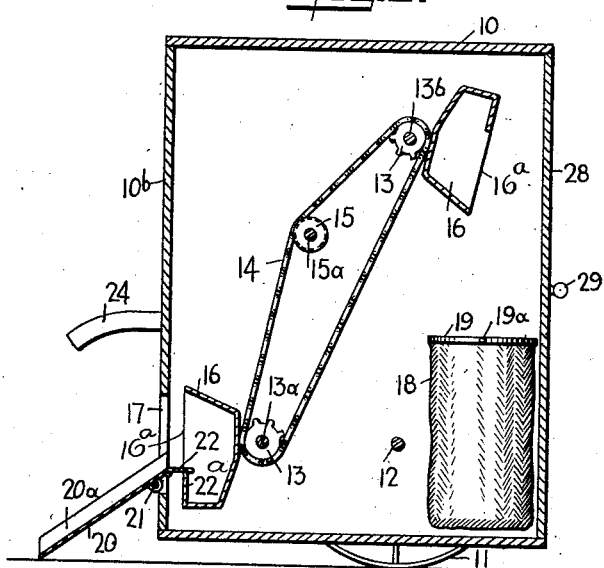
Figure 4:
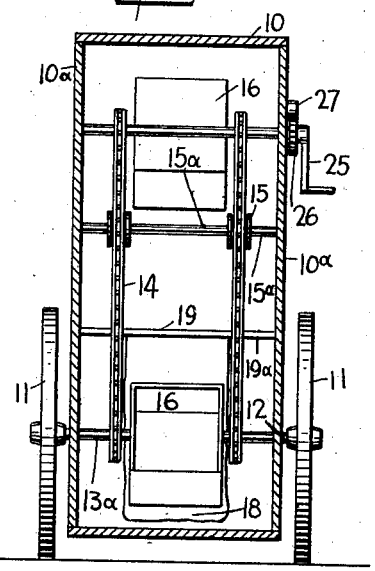

Figure 1 is a side elevation of a street cleaner's cart embodying my invention; Fig. 2 is a rear view; Fig. 3 is a longitudinal vertical section; and Fig. 4 is a transverse vertical section.

In constructing a cart in accordance with the illustrated example, a closed body 10 is provided with running wheels 11 mounted on an axle 12 supported on the sides $10^a$ of the cart body. Within the closed body 10 an endless chain 14 extends around sprocket wheels 13, which are mounted in transverse shafts, $13^a$, $13^b$, so positioned that the chain will incline upwardly. An idler roller 15 may be provided on an intermediate transverse shaft $15^a$. The chain carries buckets 16, which are adapted to be brought in succession to a receiving opening 17, and to be carried by the chain over the upper sprocket 13 to a position to dump the contents into a sack 18, said sack being sustained removably within the body 10. Any approved means may be provided for detachably supporting the sack. I have shown a ring 19, from which side-supporting members $19^a$ extend to a connection with the opposite sides $10^a$ of the cart body.

A pan 20 in the form of a plate is pivoted as at 21, to the body 10, at the bottom of the opening 17, and is provided with side flanges $20^a$. At the inner end the pan carries a pivoted section 22 ranging transversely within the cart body at the inner side of the opening 17, and forms a guide plate bridging the space between the front of a bucket 17 and the rear wall $10^b$ of the cart body. The bucket, at that end which is the bottom when the bucket is at the receiving opening, presents an upturned wall $22^a$ on the upper edge of which the bridge piece 22 may rest.

The end of the bucket opposite the bottom is inclined and extends forwardly from the back to the plane of the front $22^a$, or approximately so, and is spaced from the latter; the bucket thus presents a lateral front opening for the entrance and outflow of the sweepings. The inclined end, when the bucket is in the receiving position, overhangs the bottom and the inner end of the bridge piece, and it forms a barrier and deflector against which much of the sweepings will strike and be deflected when swept over the inclined pan 20. In the dumping position of the bucket said end forms an incline for the ready discharge of the material.

The pan 20 may be swung upward on its pivots to a raised position indicated in Fig. 1, and held by hooks $23^a$ on a chain 23, the hooks being adapted to engage studs or pins $20^b$ on the outer sides of the flanges $20^a$ of the pan. The chains $23^a$ or their equivalents are below fixed handles 24 secured to the side walls $10^a$, in position to be conveniently reached by the street cleaner, for unhooking the pan when it is desired to drop the same for receiving sweepings.

The shaft $13^a$ is provided with a crank handle 25 and with a ratchet wheel 26, and a pawl 27 pivoted on the adjacent side $10^a$ of the cart body is adapted to engage the ratchet wheel, for locking the chain against movement in order to hold a bucket 16 properly positioned at the inside of the receiving opening 17.

The front of the cart body is closed by a hinged door 28, provided with any suitable handle 29, and the supporting device for the sack 18 is positioned immediately inside the said door. When a bucket 16 has received its load of sweepings, the pawl 27 may be moved to release the ratchet wheel 26, so that the turning of the handle 25 will raise the filled bucket and bring it to a dumping position indicated at the top of Fig. 3, to empty the contents into the sack.

Having thus described my invention, I claim as new, and desire to secure by Letters Patent:

1. In a device of the character described adapted to receive sweepings, upper and lower sprockets, an endless chain thereon, a pivoted pan adapted to be disposed at an incline to conduct sweepings toward the chain, buckets on the chain, and a pivoted bridge piece carried by the pan at its inner end and adapted to bridge the space between the pan and a bucket when the latter is positioned by the chain adjacent to the pan, the bucket having a seat for the free end of the bridge piece, that end of the bucket adjacent to the seat constituting the bucket bottom and the opposite end of the bucket extending forwardly from the back and inclining, the front edge terminating approximately in the plane of the seat to present a front opening between the said inclined end and the seat.

2. In a device of the character described adapted to receive sweepings, upper and lower sprockets, an endless chain thereon, a pan to conduct sweepings toward the chain, buckets on the chain, and a movable bridge piece at the inner end of the pan adapted to bridge the space between the pan and a bucket when the latter is positioned by the chain adjacent to the pan, the bucket having a member forming a seat for the free end of the bridge piece, the end of the bucket adjacent to the said seat member constituting the bucket bottom and the opposite end of the bucket being inclined from the back and extending forwardly, said inclined end when the bucket is in a receiving position constituting an overhanging deflector, and constituting a discharge incline when the bucket is in the reversed position for dumping.

3. In a device of the character described having an inlet for the entrance of sweepings, means whereby sweepings may be directed to the said inlet, an endless carrier provided with buckets and mounted to travel upwardly and rearwardly from the inlet and return, said buckets each having a front wall at one end, that end of the bucket adjacent to the front wall constituting the bucket bottom and the opposite end of the bucket being inclined from the back and extending forwardly approximately to the plane of the front wall and spaced from the latter to present a front opening between the inclined end and the front wall, the said inclined end, when the bucket is in the receiving position constituting an overhanging deflector, and constituting a discharge incline when the bucket is in the reversed dumping position.

In testimony whereof I have signed my name to this specification in the presence of two subscribing witnesses.

THOMAS BARTIN MASON.

Witnesses:
E. A. CORBETT,
WALTER HAMMELL.

---

Copies of this patent may be obtained for five cents each, by addressing the "Commissioner of Patents, Washington, D. C."